United States Patent
Przonek et al.

(10) Patent No.: US 12,494,905 B2
(45) Date of Patent: *Dec. 9, 2025

(54) MULTIPLE ENCRYPTION DATA STORAGE AND RETRIEVAL SYSTEM

(71) Applicant: Verai Systems, LLC, Middleton, DE (US)

(72) Inventors: Richard L Przonek, Glen Head, NY (US); Lance D Reich, Albany, NY (US)

(73) Assignee: Verai System, LLC, Middletown, DE (US)

( * ) Notice: Subject to any disclaimer, the term of this patent is extended or adjusted under 35 U.S.C. 154(b) by 65 days.

This patent is subject to a terminal disclaimer.

(21) Appl. No.: 18/624,805

(22) Filed: Apr. 2, 2024

(65) Prior Publication Data

US 2024/0333489 A1 Oct. 3, 2024

Related U.S. Application Data

(60) Provisional application No. 63/456,709, filed on Apr. 3, 2023.

(51) Int. Cl.
*H04L 9/32* (2006.01)
*H04L 9/08* (2006.01)

(52) U.S. Cl.
CPC ................................. *H04L 9/0861* (2013.01)

(58) Field of Classification Search
CPC . H04L 9/0861; H04L 2209/56; H04L 9/3231; H04L 9/3239; H04L 9/50
USPC ........................................... 726/23; 713/186
See application file for complete search history.

(56) References Cited

U.S. PATENT DOCUMENTS

| | | | |
|---|---|---|---|
| 8,150,036 B2 * | 4/2012 | Paykin | G06F 21/125 380/251 |
| 8,295,490 B1 * | 10/2012 | McCoy | G06F 21/6218 380/279 |
| 11,630,912 B2 * | 4/2023 | In | H04L 9/3239 713/166 |
| 2014/0049653 A1 | 2/2014 | Leonard et al. | |
| 2015/0347999 A1 | 12/2015 | Lau et al. | |
| 2017/0005803 A1 * | 1/2017 | Brownewell | G06F 16/248 |
| 2018/0139188 A1 | 5/2018 | Iyer et al. | |
| 2018/0373464 A1 * | 12/2018 | Schoenberger | G06F 3/0647 |
| 2020/0252457 A1 * | 8/2020 | Zakrzewski | H04L 9/0637 |
| 2021/0167955 A1 * | 6/2021 | Rameez | H04L 9/0822 |

(Continued)

FOREIGN PATENT DOCUMENTS

| | | | | |
|---|---|---|---|---|
| CN | 116032475 A | * | 4/2023 | |
| CN | 118509262 A | * | 8/2024 | H04L 9/40 |

(Continued)

*Primary Examiner* — Hamza N Algibhah
(74) *Attorney, Agent, or Firm* — Bamert Regan PLLC

(57) ABSTRACT

A computer system and method for storage and retrieval of multiple encrypted data. The system and method allow a user to first encryption data with a first key only held by the user such that the user solely possesses one of the necessary keys for later decryption of the stored and encrypted data. The firstly encrypted data is then doubly encrypted and stores the data in such a secure manner that the data can be stored on a public blockchain architecture, if desired. Full decryption of the original user data can only be performed with access to the user's initial key.

20 Claims, 7 Drawing Sheets

(56) References Cited

U.S. PATENT DOCUMENTS

| | | | |
|---|---|---|---|
| 2022/0052988 A1* | 2/2022 | Gadnis | H04L 63/0464 |
| 2022/0284112 A1* | 9/2022 | Seader | G06F 21/606 |
| 2022/0284113 A1* | 9/2022 | Nelson | G06F 21/6209 |
| 2022/0335147 A1 | 10/2022 | Yedluri et al. | |
| 2022/0368685 A1* | 11/2022 | Pollack | H04L 9/16 |
| 2025/0247240 A1* | 7/2025 | Przonek | H04L 9/3231 |

FOREIGN PATENT DOCUMENTS

| | | | | |
|---|---|---|---|---|
| CN | 119129001 A | * | 12/2024 | G06F 21/602 |
| EP | 2680566 A1 | * | 1/2014 | H04L 9/3263 |
| EP | 4235473 A2 | * | 8/2023 | H04L 63/0442 |
| JP | 2006196010 A | * | 7/2006 | |
| WO | 2019207101 A1 | | 10/2019 | |
| WO | WO-2024211294 A1 | * | 10/2024 | G06F 21/606 |

\* cited by examiner

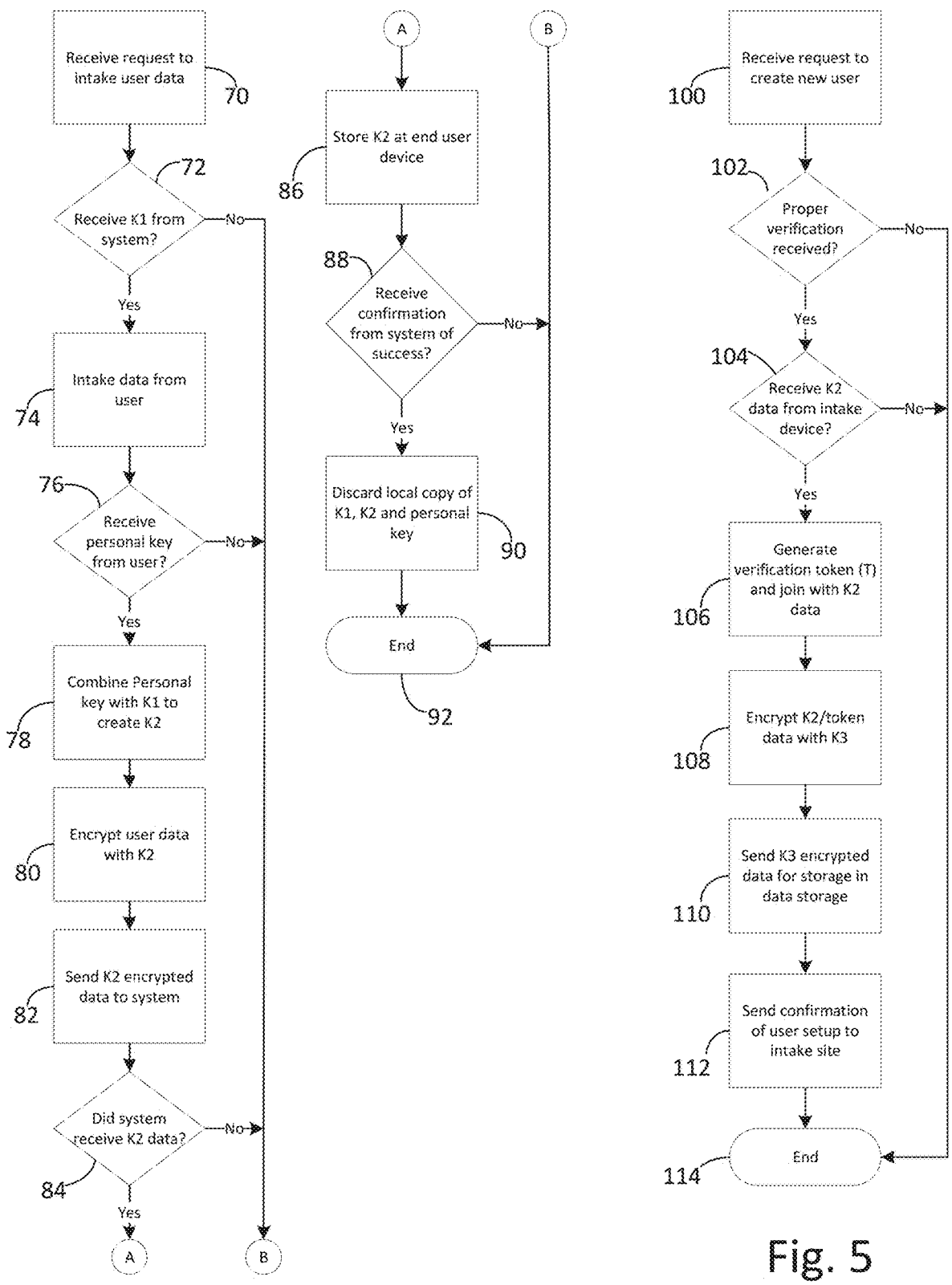

MULTIPLE ENCRYPTION DATA STORAGE AND RETRIEVAL SYSTEM

CLAIM TO PRIORITY

This application claims priority to and the benefit of the filing date of commonly assigned provisional application entitled MULTIPLE ENCRYPTION DATA STORAGE AND RETRIEVAL SYSTEM, assigned Ser. No. 63/456,709, filed Apr. 3, 2023, and is hereby incorporated by reference.

BACKGROUND OF THE INVENTION

1. Field of the Invention

The present invention generally relates to secure data storage computer systems. More particularly, the present invention is for a system and method that multiply encrypts data for secure storage and retrieval, with full decryption only possible by the end-user.

2. Description of the Related Art

Multiple encryption is the process of encrypting an already-encrypted message one or more times. The multiple encryption can be done using the same or a different algorithm. Such methodology is also called cascade encryption, cascade ciphering, and superencipherment. Superencryption refers to the outer-level encryption of a multiple encryption.

An advantage of multiple encryption is that using two different cryptomodules and keying processes from two different sources requires both sources to be compromised for security to fail completely. A cryptanalyst must break both encryptions to get any information. This will, however, have the drawback of making the encrypted data file up to twice as long as the original data.

Further, if the encryption key used is the same for both, the second cipher could possibly undo the first cipher, partly or entirely. This is true of ciphers where the decryption process is the same as the encryption process, and the second cipher would completely undo the first. If an attacker were to recover the key through cryptanalysis of the first encryption layer, the attacker could possibly decrypt all the remaining layers, assuming the same key is used for all layers. To prevent this risk, it is known to use keys that are statistically independent for each layer.

Ideally each key should have separate and different generation, sharing, and management processes. In extant multiple encryption systems, for encryption processes that require sharing an Initialization Vector (IV), these are typically, openly shared or made known to the recipient (and everyone else). It is common practice to share keys, such as in PGP message transmission.

The "Rule of Two" is a data security principle from the NSA's Commercial Solutions for Classified Program (CSfC). It specifies two completely independent layers of cryptography to protect data. For example, data could be protected by both hardware encryption at its lowest level and software encryption at the application layer. It could mean using two FIPS-validated software cryptomodules from different vendors to encrypt or decrypt data.

The importance of vendor and/or model diversity between the layers of components centers around removing the possibility that the manufacturers or models will share a vulnerability. This way if one component is compromised there is still an entire layer of encryption protecting the information at rest or in transit.

A problem arises in that if the keys for every layer of encryption are accessible or known to a data storage system, the system ultimately has direct access to the data. In extant storage systems, even hashed data can be unencrypted as the hash key is stored somewhere within the verification system, either at the intake device or some data storage accessible to the system. Consequently, the entity in control of the data storage can be compelled to produce the fully decrypted data to a third party, such as a court, law enforcement, or governmental entity.

SUMMARY OF THE INVENTION

As seen in the discussion above, there is a need to provide a system and method for secure storage of data that allows the storage of the data in a manner that does not violate or implicate privacy laws and regulations. Furthermore, it would be advantageous to store the data in a manner that is not accessible to any other person or entity than the user. This would minimize the risk of data theft and coerced production of the data.

In overview, the present invention is for a computer system and method for storage and retrieval of encrypted data from a user that allows confidential storage of data that is only accessible with the permission of the user. The system and method include a data intake device that intakes original data from a user and communicates with a data management system for encryption, storage and retrieval of the data. The data management system can have a resident data storage or a remote storage in communication therewith for the selective storage and retrieval of the multiply encrypted data.

The system and method allow a user to firstly encrypt data such that the user solely possesses one of the necessary encryption keys for full decryption of the stored and encrypted data. The encrypted data is then at least doubly encrypted and stored in such a secure manner that it can be stored on a public blockchain architecture if desired. Full decryption of the original user data can only be performed with access to the user's encryption key.

In one embodiment, the system includes a data intake device that selectively intakes data from a user, with the device communicably connected to a network, such as the Internet, WAN, or other public or private network. A data management system is also connected to the network and in selective communication with the data intake device, with the data management system in communication with at least one data storage for the selective storage and retrieval of the multiply encrypted data. Upon a request from the data intake device to intake a new user data, the data management system transmits a first encryption key to the data intake device for original user data intake.

The data intake device then receives the first encryption key from the data management system and obtains a user key from a user, and then creates a second encryption key from the first encryption key and user key, either through hashing or other mathematical operation. Once the second key is created at the device, the device intakes and encrypts the original user data with the second encryption key to create a first encrypted user data, and then transmits the first encrypted user data to the data management system across the network. In one embodiment, the device then stores the second encryption key at a device of the user and deletes the second encryption key (and user key and first encryption key) from the data intake device.

Upon receipt of the first encrypted user data, the data management system generates a third encryption key, further encrypts the first encrypted user data with the third encryption key to create a second encrypted user data, and stores the second encrypted user data at a data storage. The data storage can be either a local, remote, or cloud-based storage, and can be public or private.

In one embodiment, the data management system further creates a verification token and embeds the verification token with the first encrypted user data prior to encrypting the encrypted user data with the third encryption key, such that second encrypted user data contains the verification token embedded therein. The system then stores the second encrypted user data. In this embodiment, when the system receives a user request for the user data, with the request including the second encryption key, the system retrieves the second encrypted user data from the data storage, decrypts the second encrypted user data with the third key such that the data becomes first unencrypted user data and the verification token. The system then verifies the integrity of the verification token which indicates the first encrypted user data was successfully stored and retrieved. A plurality of verification tokens can also be utilized within the stored data. The system then decrypts the first encrypted user data with the second encryption key received from the user to become original user data.

The present system and method for intake and secure storage of data therefore provides an advantage in that it allows the storage of data in a manner that is not accessible without a key from the user. The system and method can therefore store data in a manner that minimizes the risk of data theft and coerced production. Only upon user permission (with the key) can the stored encrypted data be retrieved and unencrypted into its original form.

BRIEF DESCRIPTION OF THE DRAWINGS

FIG. 4 is a flowchart of one embodiment of a process for a user to intake data into a data device.

FIG. 5 is a flowchart of one embodiment of a process for initial setup and intake of encrypted data from a user at the data management system, including the use of an embedded verification token in the doubly encrypted data.

DETAILED DESCRIPTION OF THE INVENTION

Figure 1:
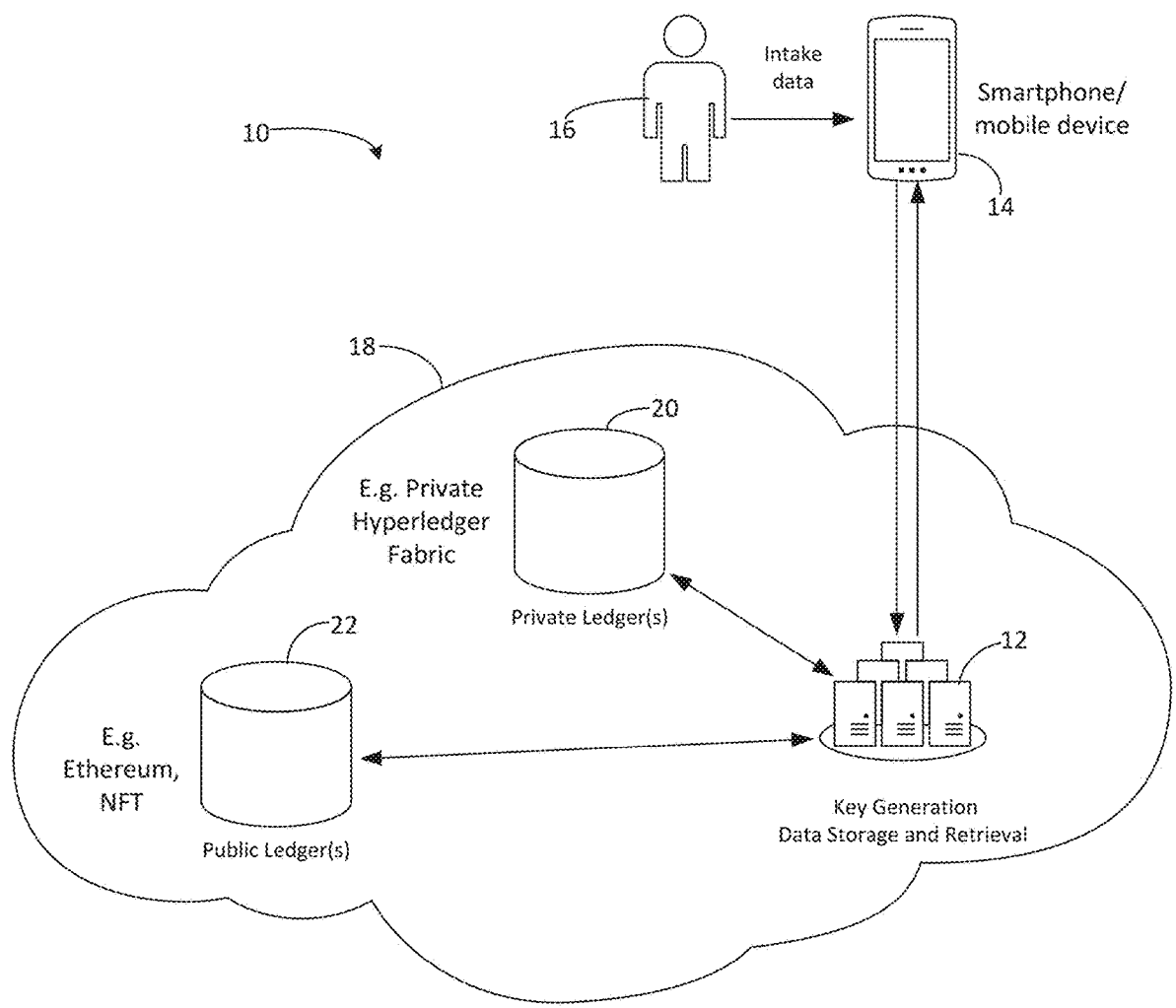
FIG. 1 is a representative diagram illustrating one embodiment of the data management system in selective communication with a data intake device, embodied here a smartphone mobile device.

With reference to the figures in which like numeral represent like elements throughout, FIG. 1 is a representative diagram illustrating one embodiment of one architecture of a system 10 for data management. Here, a data management system 12 is embodied as virtual servers connected to a network 18, shown here as the Internet, and data management system 12 is in selective communication with the data intake device 14, which is embodied here as a smartphone/mobile device for an end user 16 who will store encrypted data on the data management system 12. As embodied here, the data management system 12 is in further communication with at least one data storage for the selective storage and retrieval of encrypted data. The data storage shown in this embodiment is a private Hyperledger fabric database 20, as well as a public ledger 22, such as ETHEREUM, NFT, or other public blockchain architecture.

In the embodiment of FIG. 1, the data intake device, embodied here a smartphone/mobile device 14 is configured to selectively intake data from a user 16, such as the intake of a data file, and will selectively communicate across the network to encrypt and store that data in the data management system 12 as is further described herein.

Figure 2:
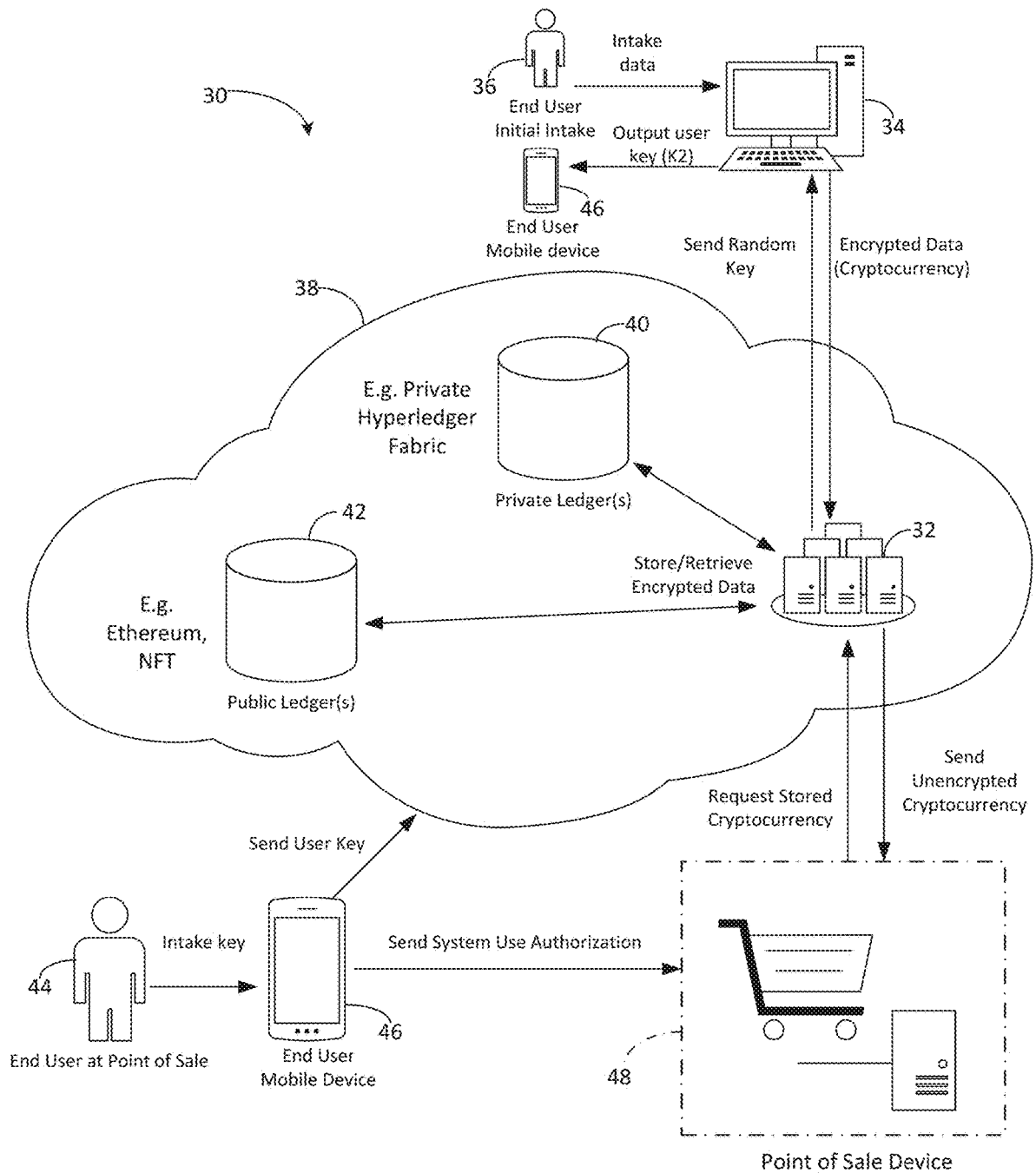
FIG. 2 is a representative diagram illustrating one embodiment of the data management system with a dedicated data intake device, a user device, and a point-of-sale device for a cryptocurrency purchase transaction.

FIG. 2 is a representative diagram illustrating another embodiment of the system 30 for data management that allows point-of-sale use of stored cryptocurrency, such as in an online crypto-wallet. In this embodiment, there is a data intake device 34, a user device 46 (e.g., an end user mobile device), and a point-of-sale device 48 (also referred to as a point-of-sale verification device or point-of-verification device) are used for purchase with cryptocurrency. Here, one embodiment of the data management system 32 is embodied with virtual servers connected to a network 38, shown here as the Internet, but can be any private or public wired or wireless data communication network. The data management system 32 is in selective communication with several devices across the network 38.

The data intake device 34 that will initially intake cryptocurrency from an end user 36, which can be a sent computer, laptop, or other specialized equipment to intake data such as fingerprints, retina scans, face-scans, and DNA. In this configuration, the end user 44 at a point-of-sale 48 who desires to use stored cryptocurrency for a transaction will have a mobile device 46 with them, here embodied as a smartphone/mobile device 46, that will hold the user key necessary to authorize the decryption of the stored cryptocurrency as is further described herein.

As embodied in FIG. 2, the data management system 32 is in further communication with at least one data storage for the selective storage and retrieval of encrypted data, here being cryptocurrency or a crypto-wallet. The data storage shown in this embodiment is a private Hyperledger fabric database 40, as well as a public ledger 42, such as ETHEREUM, NFT, or other public blockchain architecture. In this embodiment, the point-of-sale 48, and the computer device thereat, can make the ultimate retrieval of the cryptocurrency of the end user 44 for a desired transaction. The cryptocurrency is multiple-encrypted by the system and cannot be fully decrypted without the key from the end user 44.

Figure 3A:
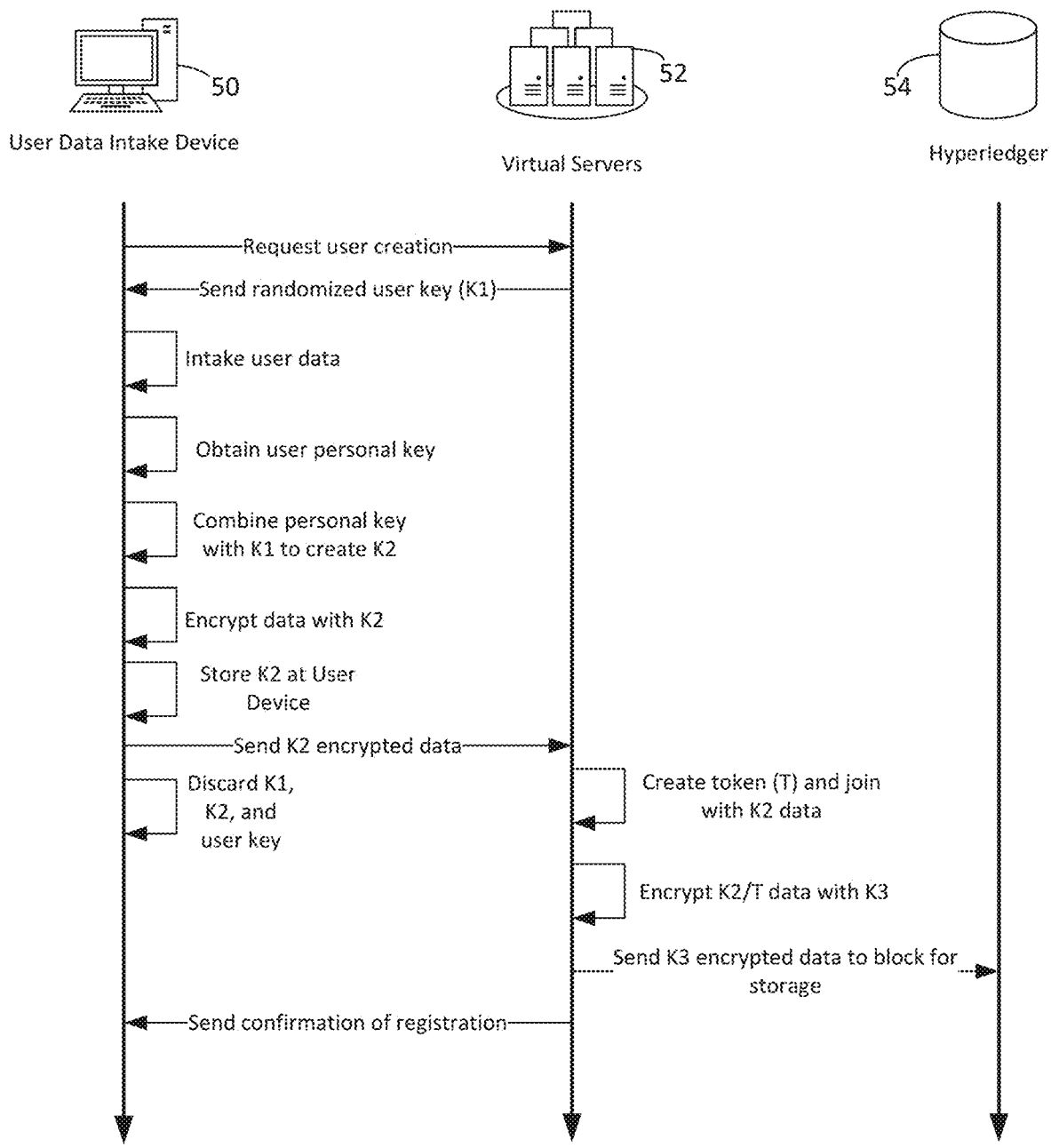
FIG. 3A is a data-flow diagram illustrating the data-flow and processes between the user data intake device, virtual servers of the data management system and a data storage embodied as a Hyperledger fabric.

FIG. 3A is a data-flow diagram illustrating the data-flow and processes between the user data intake device 50, virtual servers of the data management system 52 and a data storage 54, embodied as a Hyperledger fabric. In this embodiment, upon a request from the data intake device to intake user data, the user data intake device 50 sends a request for data intake for user creation to the virtual servers 52, which then transmits a first encryption key (K1) to the data intake device 50 for original user data intake. The Key K1, or any key described herein can be any standard session random or pseudorandom number of any size. In one embodiment, the key K1 is a 256-bit hexadecimal prime number generated at random.

The data intake device 50 then receives the first encryption key (K1) from the virtual servers 52 and intakes user data, and then obtains a user key from a user. That user key can be any data provided by the user, such as a pin, answer to a question, a word, a key sent from a user device, such as mobile device, or data. The intake of the data can be a data file in any format, to include cryptocurrency, multimedia, documents, and other keys. The data can be stored in an open-source or other formats, such that it is usable on common data platforms.

The data intake device 50 then creates a second encryption key (K2) from the first encryption key and user key, either through hashing or other mathematical operation between the keys. In doing so, this allows the creation of the second key (K2) to be unknown to the virtual servers 52, especially as the local copies of the user key, first key (K1) and second key (K2) are deleted from the intake device 50 as is further described herein. Once the second key (K2) is created, the data intake device 50 intakes original user data from the user or can be done simultaneously or prior to the creation of the second key (K2) The data intake device 50 then encrypts the original user data with the second encryption key (K2) to create a first encrypted user data (K2 encrypted data). If embodied with solely the user mobile device, such as smartphone/mobile device 14 in FIG. 1, as the data intake device, the intake process can occur solely at the mobile device 14 as described herein.

Each encryption step can be hashing, prime-key pair multiplication, elliptical curve cryptography, or any other satisfactory one-way mathematical encryption. The encryption with K2 means that the user's data will not be accessible to the data management system without K2 being provided from the user. This allows the system to be secure against insider theft or attack to access unencrypted user data that is stored on or through the system.

The data intake device 50 then transmits the first encrypted user data to the virtual server 52 of the data management system (32 in FIG. 2) across the network (38 in FIG. 2). In one embodiment, the device then stores the second encryption key (K2) at a device (46 in FIG. 2) of the user (44 in FIG. 2) and deletes the second encryption key (and user key) and first encryption key (K1) from the data intake device 50. If embodied with solely the user mobile device at the data intake device, such as smartphone/mobile device 14 in FIG. 1, the mobile device 14 will store the second encryption key (K2) and delete the first encryption key (K1) and user key. The mobile device 14 can also be embodied to transfer K1 to other devices and locations in a secure manner at the direction of the end user 16.

Upon receipt of the first encrypted user data, the virtual servers 52 of data management system generates a verification token (T) for the encryption and decryption of the first encrypted data. In some examples, the verification token (T) is an encryption key. The verification token (T) can be any number of any size, but should be sufficient to supply the belief that an error of the verification token will indicate a compromise/error of first encrypted data. One or more verification tokens (T) can also be used and placed with a selected block of first encrypted data (K2 encrypted data) before it is encrypted with a third key (K3). The virtual servers 52 then creates a further key (K3) that it uses to further encrypt the first encrypted user data with the verification token to create a second encrypted user data (K3 encrypted data). The virtual servers 52 then stores the second encrypted user data at a data storage 54, shown here as a Hyperledger fabric. The virtual servers 52 then sends a confirmation of storage of the data to the data intake device 50.

Figure 3B:
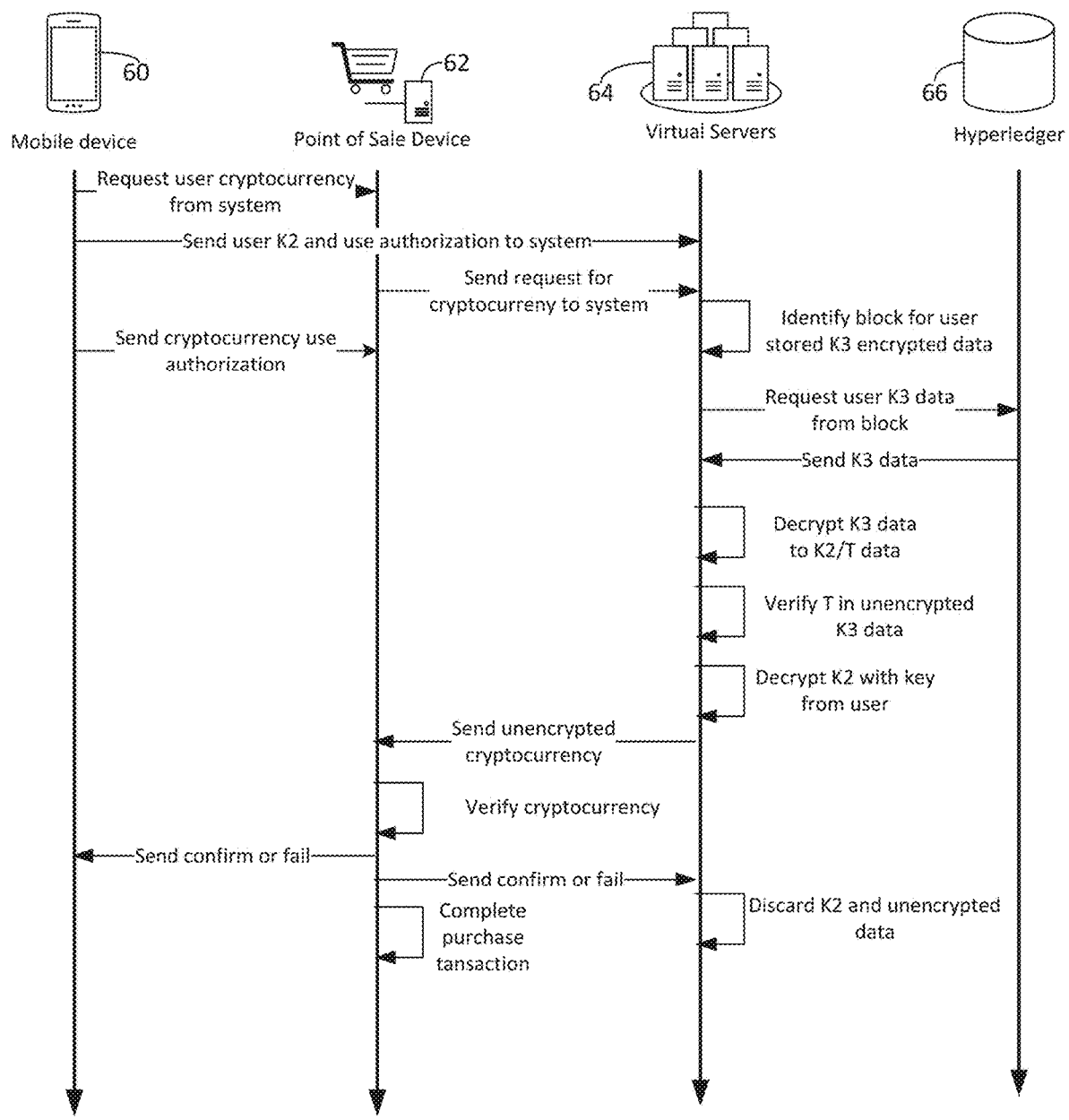
FIG. 3B is a data-flow diagram illustrating the data-flow and processes between a user's mobile device, a point-of-sale device, the virtual servers of the data management system, and the data storage embodied as a Hyperledger fabric.

FIG. 3B is a data-flow diagram illustrating one embodiment of the data-flow and processes for use of a stored and secured cryptocurrency by an end user. In this embodiment, which can utilize the system 30 as architected in FIG. 2, the process utilizes a user's mobile device 60, a point-of-sale device 62, the virtual servers 64 of the data management system, and the data storage 66 embodied as a Hyperledger fabric. The mobile device 60 of the user sends a request for the user's cryptocurrency to both the point-of-sale system 62 and the virtual servers 64 of the data management system (32 in FIG. 2), with the request for authorization of the system 30 (FIG. 2) including the second encryption key (K2). The point-of-sale device 62 likewise sends a request for the cryptocurrency to the virtual servers 64 such that the virtual servers 64 can correspond the mobile device 60 request to the point-of-sale device 62 request.

Once the user authorization request is received, the virtual servers 64 then identify the specific storage block(s) of the doubly-encrypted user stored cryptocurrency (K3 encrypted data) at the Hyperledger 66, then request that block from the Hyperledger 66 to retrieve the second encrypted user cryptocurrency from the Hyperledger 66 data storage. The Hyperledger 66 then sends the block(s) of second encrypted user cryptocurrency (K3 encrypted data). In this embodiment, the virtual servers 64 then request a new storage block for the second encrypted data and the Hyperledger 66 accordingly moves the K3 encrypted data to the new storage block(s) and sends the new block position(s) to the virtual servers 64. In such embodiment, the storage blocks can be a on public Hyperledger and accessible, as a third-party will neither know which specific block a user's data is held in or have the encryption keys decrypt the block.

The virtual servers 64 then decrypt the second encrypted user data with the third key (K3) such that the data becomes first unencrypted user data and the verification token(s) (T). The virtual servers 64 can then verify the integrity of the verification token(s) (T). Then if embodied as receiving the second encryption key (K2) from the user device as shown, the virtual servers 64 unencrypts the first encrypted user data with the second encryption key (K2) to become original user data, i.e., the cryptocurrency. The virtual servers 64 then send the unencrypted data as a reference set to the point-of-sale device 62. The point-of-sale device 62 can then compare the new data from the user with the reference dataset to verify the identity of the user. The point-of-sale device 62 can then send a confirm or fail to the mobile device 60 to inform the user of the purchase transaction confirm or fail, and can also send the confirm or fail to the virtual servers 64 such that the system 30 is aware of the fate of the transaction.

In this embodiment, the point-of-sale device 62 also discards all cached copies, as well as the user's K1. The point-of-sale device 62 can also store a record of the transaction and can interact with the virtual servers 64 to make a record of the particulars of the transaction including the confirmation of the verification of user identity. The virtual servers 64 may discard the first encrypted user data with the second encryption key (K2).

FIG. 4 is a flowchart of one embodiment of a process for a user to intake data from a user data device, such as intake device 34 in FIG. 2. The process in FIG. 4 is similar to that shown in the dataflow of FIG. 3A. The device receives a request to create a new user and intake information to the system (30 in FIG. 2), as shown at step 70, and then a determination is made as to whether the first encryption key (K1) has been received from the data management system (virtual servers 32 in FIG. 2), as shown at decision 72. If the first encryption key (K1) has not been received at decision 72, then the process forwards to end, at termination 92. Otherwise, if the first encryption key (K1) has been received at decision 72, then the device intakes the data from the user (end user 36 in FIG. 2), as shown at step 74, and then a determination is made as to whether a personal user key has been received from the user, as shown at decision 76.

If the personal user key has not been received at decision 76, then the process forwards to end, at termination 92. Otherwise, the device then combines the personal user key with the first encryption key (K1) to create a second encryption key (K2), as shown at step 78, and the user data is encrypted with the second encryption key (K2) as shown at step 80. Then the first encrypted data is sent to the data management system (virtual servers 32 in FIG. 2), as shown at step 82, and then a determination is made as to whether the data management system received the first encrypted user data set, as shown at decision 84. If the system did not receive the first encrypted data set at decision 84, then the process forwards to end at termination 92. Otherwise, if the first encrypted user data set has been received at the data management system at decision 84, then the second encryption key (K2) is stored at the user device (46 in FIG. 2), as shown at step 86.

Then a determination is made as to whether a confirmation has been received from the data management system as to whether the first encrypted user data was successfully stored by the system, as shown at decision 88. If confirmation is not received at decision 88, then the process forwards to end at termination 92. Otherwise, if the confirmation is received at decision 88, then the first encrypted key (K1), the user personal key, and the second encryption key (K2) are discarded (e.g., deleted) from the data intake device (34 in FIG. 2), as shown at step 90, and then the process ends at termination 92.

FIG. 5 is a flowchart of one embodiment of a process for initial setup and intake of encrypted data from a user at the data management system, such as virtual servers 32 in FIG. 2, including the use of an embedded verification token in the doubly encrypted data. The process in FIG. 5 is similar to that shown in the dataflow of FIG. 3A. The process begins with the virtual servers 32 receiving a request to intake new user data from the data intake device (50 in FIG. 3A), as shown at step 100. Then a determination is made as to whether a proper verification of the data intake device (50 in FIG. 3A) is received, as shown at decision 102. The proper verification of the device can be a key, pin, or other security verification that the device can properly intake user data and upload it to the data management system (virtual servers 52 in FIG. 3A) for the session.

If verification does not occur at decision 102, then the process forwards to end at termination 114. Otherwise, if verification does occur at decision 102, then a determination is made as to whether the first encrypted user data (K2 encrypted data or K2 data) has been received from the data intake device (50 in FIG. 3A) as shown by decision 104. If the first encrypted user data has not been received at decision 104, then the process forwards to end at termination 114. Otherwise, if the first encrypted user data is received at decision 104, then the data management system (virtual servers 52 in FIG. 3A) generates (i.e., creates) one or more verification tokens (T) and joins (i.e., embeds) it(them) to the first encrypted user data, as shown at step 106. Then the first encrypted user data and the verification token (T) are encrypted with a third encryption key (K3), as shown at step 108, to create a second encrypted user data.

Then the second encrypted user data (K3 encrypted data) is sent to a data storage, such as Hyperledger fabric 54 in FIG. 3A, for storage in one or more blocks, as shown at step 110. The storage can be private or open depending on preference. Then the data management system sends confirmation to the data intake device of user setup and storage of the second encrypted data storage, as shown at step 112, and then the process ends at termination 114.

In one embodiment, the first layer of the encryption (K2) the original data is hashed, and subsequently the symmetric keys are encrypted via an asymmetric key (e.g., deploying the algorithm RSA). In an intermediate step the first encrypted data, and the hash digest are combined into a capsule, and packed together. For the system to verify that the ciphertext has not been tampered with, the digest is computed before a retrieved data file is fully decrypted. Optionally, one can encrypt the capsule of the first layer in addition with an AES-256, comparable to a commonly shared, 32-character long symmetric password. Hybrid Encryption can then be added to create multiple encryption.

Figure 6:
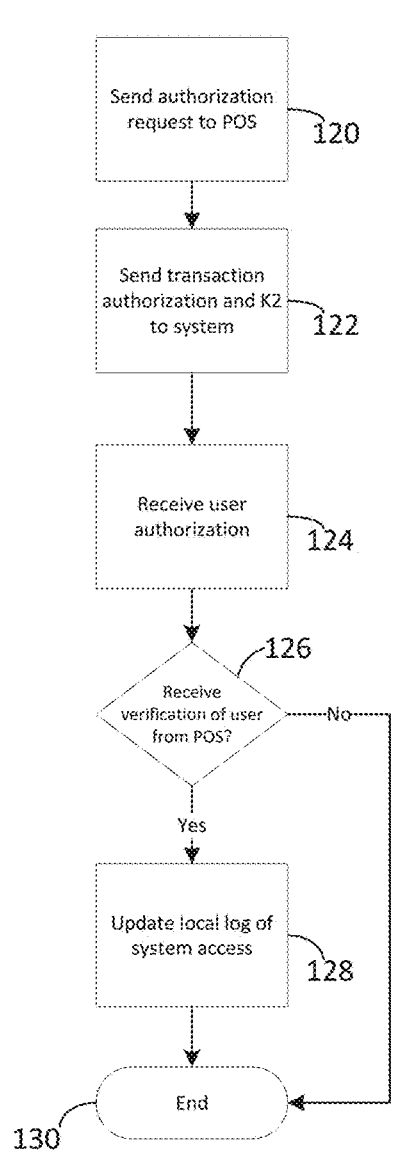
FIG. 6 is a flowchart of one embodiment of a process for a user to request decryption of a cryptocurrency at a point-of-sale.

FIG. 6 is a flowchart of one embodiment of a process for a user (end user 44 in FIG. 2) to request decryption of stored encrypted cryptocurrency at a point-of-sale (48 in FIG. 2). The process in FIG. 6 is similar to that shown in the dataflow of FIG. 3B. The process start when the user (end user 44), through their user mobile device (46 in FIG. 2) in this embodiment, sends an authorization for use of stored cryptocurrency to the point-of-sale (62 in FIG. 3B), as shown at step 120, and then sends a transaction authorization and the second encryption key (K2) to the data management system (virtual servers 64 in FIG. 3B), as shown at step 122. Then the user mobile device 60 intakes the end user 44 transaction data locally for use in a comparison with the local transaction, as shown at step 124. Then a determination is made as to whether the verification for the user has been approved at the point-of-sale device 62, as shown at decision 126.

If the authorization of the verification has not been received at decision 126, then the process forwards to end at termination 130. If the authorization has been received at decision 126, then the local log of data management system (virtual servers 64) is updated and the process ends at termination 130. Step 128 is merely an embodiment and is not required to perform the process described herein.

Figure 7:
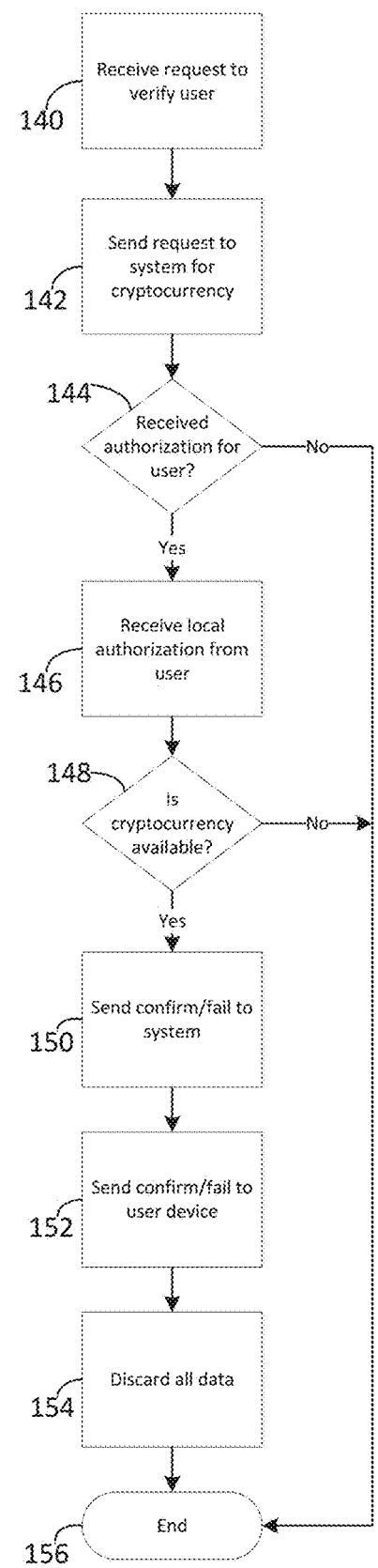
FIG. 7 is a flowchart of one embodiment of a process for verification of a user purchase transaction by the data management system.

FIG. 7 is a flowchart of one embodiment of a process for a purchase transaction for cryptocurrency sent from the data management system (such as virtual server 32 in FIG. 2) at a point-of-sale (such as point-of-sale 48 in FIG. 2). The process in FIG. 7 is similar to that shown in the dataflow of FIG. 3B. The process starts with receipt of a request from a user mobile device (60 in FIG. 3B) to use the system for a point-of-sale (POS) purchase, as shown at step 140. Then the point-of-sale device 62 sends a request for a cryptocurrency for that user to the data management system (virtual servers 64 in FIG. 3B), as shown at step 142.

A determination is then made as to whether the transaction authorization has been received for the user, as shown at decision 144. If the authorization has not been received at decision 144, then the process forwards to end at termination 156. Otherwise, if the authorization set has been received at decision 144, then the local data is received from the user (end user 44 in FIG. 2) at the user mobile device (46 in FIG. 2; mobile device 60 in FIG. 3B), as shown at step 146. The user data can be obtained from the point-of-sale device 62 if it is embodied with the requisite equipment to do so. One of skill in the art can reconfigure the devices and dataflow accordingly to have different steps of the processes described herein performed at different devices and locations on the system.

After step 146, a determination is then made as to whether the transaction is authorized, thus confirming or disproving user identity, as shown at decision 148. If the data does not match at decision 148, i.e., the requested cryptocurrency is the user's, then the process forwards to end at termination 156. Otherwise, if a match is confirmed at decision 148, then a confirm or fail is sent to the data management system (virtual servers 64), as shown at step 150, and a confirm or fail is also sent to the user device 60, as shown at step 152. Then all data is discarded from the point-of-sale 62, as shown at step 154 and the process ends at termination 156.

Figure 8:
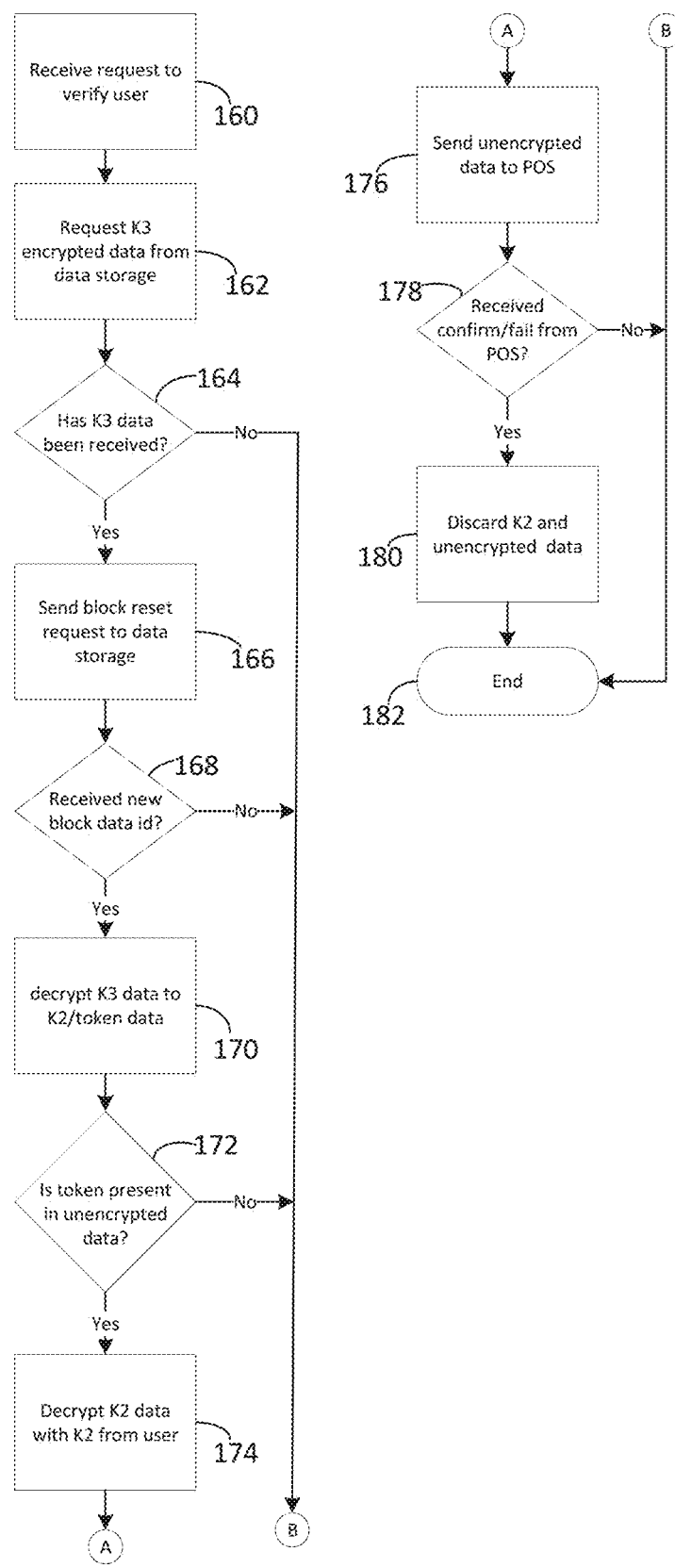
FIG. 8 is a flowchart of one embodiment of a process for full decryption of stored user data with use of a verification token for data integrity.

FIG. 8 is a flowchart of one embodiment of a process for full decryption of stored user data with use of a verification token for data integrity at the data management system (such as the virtual servers 32 in FIG. 2, or virtual servers 64 in FIG. 3b). The process in FIG. 8 is similar to that shown in the dataflow of FIG. 3B. The process begins with the data management system (virtual servers 64) receiving a request from a user, either from the user device 60, the point-of-sale device 62 or both, as shown at step 160. Then the data management system requests the user's second encrypted user data (K3 encrypted data, also referred to as K3 data) from the data storage, such as Hyperledger fabric 64 in FIG. 3B, as shown at step 162. In this embodiment, this request includes the stored encrypted user data from the one or more blocks where the data is stored. A determination is then made on whether the second encrypted user data has been received, as shown at decision 164.

If the second encrypted user data has not been received at decision 164, then the process forwards to end at termination 182. Otherwise, if the data has been received at decision 164, then a storage block reset request is sent to the data storage (Hyperledger fabric 66 in FIG. 3B) such that the stored data is moved, as shown at step 166. This step allows the storage of the second encrypted user data to be on a public blockchain or other publicly-accessible storage media. After step 166, a determination is made as to whether confirmation is received from the data storage (Hyperledger fabric 66) that the data block(s) have been successfully moved and the new location of the block(s), as shown at decision 168. If the confirmation and new location has not been received at decision 168, then the process forward to end at termination 182. Otherwise, if the confirmation and new location has been received at decision 168, then the data management system (virtual servers 64) decrypts the second encrypted user data to be the first unencrypted user data (K2 encrypted data) and the verification token (T), as shown at step 170.

A determination is then made on whether the intact verification token (T) is present in the unencrypted data, as shown in decision 172. If multiple verification tokens are present in multiple blocks of unencrypted data, then decision 172 can be the iteration through all data integrity checks in the newly decrypted data. If the verification token is not intact at decision 172, then the process forwards to end at termination 182. Otherwise, if the verification token(s) is intact at decision 172, then the second encrypted user data is decrypted with the sent key (K2) from the user to become unencrypted original user data (K2 data), as shown at step 174, and then the original data is sent to the point-of-sale device 62 for comparison of the new user data and verification of the user identity, as shown at step 176. In this case, the point-of-sale device 62 may be referred to as a third-party comparison device. Thus, the data management system may be configured to transmit the original user data to the third-party comparison device across the network.

In another embodiment, the data management system itself can obtain the new user data for comparison, such as at virtual servers 32, and send the results to other devices across the network. For example, the data management system may retrieve new user data from the point-of-sale device (e.g., point-of-sale device 62) across the network. The data management system may compare the new user data against the unencrypted original user data to determine a matching status. The data management system may then transmit the matching status to the point-of-sale device across the network.

After step 176, a determination is then made as to whether the user was confirmed or failed at the point-of-sale device 62, as shown at decision 178. If the confirm/fail has not been received at decision 178, then the process forwards to end at termination 182. Otherwise, if the confirm/fail is received at decision 178, then the data management system (virtual servers 64) discards the second encryption key (K2) and all original user data is deleted from the system, as shown at step 180, and the process ends at termination 182.

It should be appreciated that one of skill in the art would be able to have different parts of the processes descried herein performed by different devices at different locations, either locally or remotely located. For example, the data can be collected at the user device 46, data intake device 34, or point-of-sale 48. Furthermore, the use of keys can be done singularly or in multiple with keys apportioned to data blocks for either encryption or data integrity verification as is known in the art.

What is claimed is:

1. A system for storage and retrieval of encrypted data, comprising:
   a data intake device configured to selectively intake data from a user, the data intake device selectively communicably connected to a network, the data network device sending and receiving data across the network; and
   a data management system connected to the network and in selective communication with the data intake device, the data management system in further communication with at least one data storage for the selective storage and retrieval of encrypted data,
   wherein the data management system is selectively configured to transmit a first encryption key to the data intake device for original user data intake;
   wherein the data intake device receives the first encryption key from the data management system and is further configured to:
   receive a user key from a user;
   create a second encryption key from the first encryption key and the user key;
   intake original user data from the user;
   encrypt the original user data with the second encryption key to create a first encrypted user data;

transmit the first encrypted user data to the data management system;
store the second encryption key at a device of the user; and
delete the second encryption key from the data intake device;
wherein the data management system is further configured to:
generate a third encryption key;
further encrypt the first encrypted user data with the third encryption key to create a second encrypted user data; and
store the second encrypted user data at a data storage.

2. The system of claim 1, wherein the data management system further configured to:
create a verification token;
embed the verification token with the first encrypted user data prior to encrypting the encrypted user data with the third encryption key to become second encrypted user data; and
store the second encrypted user data with the verification token embedded therein.

3. The system of claim 2, wherein the data management system further configured to:
receive a user request for the original user data, the user request including the second encryption key;
retrieve the second encrypted user data from the data storage;
decrypt the second encrypted user biometrics data with the third key such that the data becomes first unencrypted user data and the verification token;
verify the integrity of the verification token; and
decrypt the first encrypted user data with the second encryption key to become the original user data.

4. The system of claim 3, wherein the data management system further configured to transmit the original user data to a third-party comparison device across the network.

5. The system of claim 3, wherein the data management system further configured to:
retrieve new user data from a point-of-sale device across the network;
compare the new user data against the unencrypted original user data to determine a matching status; and
transmit the matching status to the point-of-sale device across the network.

6. The system of claim 1, wherein the data management system is further configured to store the second encrypted user data at a data storage across the network.

7. The system of claim 1, wherein the data management system is further configured to store the second encrypted user data in Hyperledger fabric.

8. The system of claim 7, wherein the data management system is further configured to store the second encrypted user data in a public blockchain.

9. A method of storing and retrieving encrypted data, comprising the steps of:
communicating an original data intake request from a data intake device to a biometrics data management system, the data intake device selectively communicably connected to a network, and the data intake device sending and receiving data across the network;
transmitting a first encryption key from the data management system to the data intake device, the data management system connected to the network and in selective communication with the data intake device;
the data intake device further:
receiving the first encryption key from the data management system;
receiving a user key from a user;
creating a second encryption key from the first encryption key and the user key;
intaking at the data intake device original user data from the user;
encrypting the original user data with the second encryption key to create a first encrypted user data;
transmitting the first encrypted user data to the data management system;
storing the second encryption key at a device of the user; and
deleting the second encryption key from the data intake device; and
the data management system further:
generating a third encryption key;
encrypting the first encrypted user data with the third encryption key to create a second encrypted user data; and
storing the second encrypted user data at a data storage.

10. The method of claim 9, wherein, at the data management system, further:
creating a verification token;
embedding the verification token with the first encrypted user data prior to encrypting the encrypted user data with the third encryption key to become second encrypted user data; and
storing the second encrypted user data with the verification token embedded therein.

11. The method of claim 10, wherein, at the data management system, further:
receiving a user request for the original user data, the user request including the second encryption key;
retrieving the second encrypted user data from the data storage;
decrypting the second encrypted user biometrics data with the third key such that the data becomes first unencrypted user data and the verification token;
verifying the integrity of the verification token; and
decrypting the first encrypted user data with the second encryption key to become the original user data.

12. The method of claim 11, wherein, at the data management system, further transmitting the original data to a third-party comparison device across the network.

13. The method of claim 11, wherein, at the data management system, further:
retrieving new user data from a point-of-sale device across the network;
comparing the new user data against the unencrypted original user data to determine a matching status; and
transmitting the matching status to the point-of-sale device across the network.

14. The method of claim 9, wherein, at the data management system, further storing the second encrypted user data at a data storage across the network.

15. The method of claim 9, wherein, at the data management system, further storing the second encrypted user data in Hyperledger fabric.

16. The method of claim 15, wherein, at the data system, further storing the second encrypted user data in a public blockchain.

17. A system for storage and retrieval of encrypted data, comprising:
a data intake means for selectively intaking original data from a user, the data intake means selectively communicably connected to a network, and the data intake means sending and receiving data across the network;

a data management means for managing the storage and retrieval of encrypted data, the data management means connected to a network and in selective communication with the data intake means, the data management means in further communication with at least one data storage means for the selective storage and retrieval of encrypted data, wherein the data management means is further configured for transmitting a first encryption key to the data intake means for original user data intake;

wherein the data intake means is further configured for:
  receiving the first encryption key from the data management means
  receiving a user key from a user;
  creating a second encryption key from the first encryption key and the user key;
  intaking original user data from the user;
  encrypting the original user data with the second encryption key to create a first encrypted user data;
  transmitting the first encrypted user data to the data management means;
  storing the second encryption key at a device of the user; and
  deleting the second encryption key from the data intake device; and wherein the data management means is further configured for:
  generating a third encryption key;
  encrypting the first encrypted user data with the third encryption key to create a second encrypted user data; and
  storing the second encrypted user data at a data storage means for storing data.

18. The system of claim 17, wherein the data management means is further configured for:
  creating a verification token;
  embedding the verification token with the first encrypted user data prior to encrypting the encrypted user data with the third encryption key to become second encrypted user data; and
  storing the second encrypted user data with the verification token embedded therein.

19. The system of claim 17, wherein the data management means is further configured for:
  receiving a user request for the original user data, the user request including the second encryption key;
  retrieving the second encrypted user data from the data storage means;
  decrypting the second encrypted user biometrics data with the third key such that the data becomes first unencrypted user data and the verification token;
  verifying the integrity of the verification token; and
  decrypting the first encrypted user data with the second encryption key to become the original user data.

20. The system of claim 19, wherein the data management means is further configured for transmitting the original user data to a third-party comparison means for comparing new user data with original user data.

* * * * *